United States Patent [19]
Mizuta et al.

[11] Patent Number: 5,487,802
[45] Date of Patent: Jan. 30, 1996

[54] ULTRASONIC WELDING METHOD AND APPARATUS FOR MOLDED RESIN MATERIALS

[75] Inventors: Akira Mizuta; Fumio Yamazaki, both of Kanagawa, Japan

[73] Assignee: Fuji Photo Film Co., Ltd., Kanagawa, Japan

[21] Appl. No.: 815,160

[22] Filed: Dec. 31, 1991

[30] Foreign Application Priority Data

Jan. 9, 1991 [JP] Japan ................................ 3-001044

[51] Int. Cl.$^6$ .................................................. B32B 31/16
[52] U.S. Cl. .................... 156/73.1; 156/358; 156/580.1
[58] Field of Search ......................... 156/64, 73.1, 73.4, 156/358, 580, 580.1, 580.2, 581, 583.1, 583.91

[56] References Cited

U.S. PATENT DOCUMENTS

| | | | |
|---|---|---|---|
| 2,371,847 | 3/1947 | Saunders et al. | 156/583.1 X |
| 3,283,052 | 11/1966 | Munk | 156/583.1 X |
| 4,409,063 | 10/1983 | Brown | 156/580 X |
| 4,410,383 | 10/1983 | Lipari | 156/73.1 |
| 4,693,771 | 9/1987 | Payet et al. | 156/73.3 |
| 4,711,693 | 12/1987 | Holze, Jr. | 156/580.1 |
| 4,911,301 | 3/1990 | Dieffenbach | 156/73.1 X |

FOREIGN PATENT DOCUMENTS 1127825  8/1989  Japan .

*Primary Examiner*—David A. Simmons
*Assistant Examiner*—J. Sells
*Attorney, Agent, or Firm*—Sughrue, Mion, Zinn, Macpeak & Seas

[57] ABSTRACT

In an ultrasonic welding method and apparatus for molded resin materials, molded resin materials, whose corresponding parts to be welded to each other have been superposed one upon the other, are held between a welding horn and a molded material receiving section, and the corresponding parts of the molded resin materials are welded to each other with an ultrasonic welding process. A plurality of parts of the molded material receiving section are supported independently of each other by a plurality of receiving section support members. When the corresponding parts of the molded resin materials are welded to each other, the supporting forces of the plurality of the receiving section support members are adjusted independently of each other such that a welding pressure applied by the welding horn onto each pair of the corresponding parts of the molded resin materials may become equal to a predetermined value. The corresponding parts of the molded resin materials are thus accurately joined to each other without any adverse effect occurring from fluctuations in the thicknesses of the molded resin materials.

10 Claims, 4 Drawing Sheets

ULTRASONIC WELDING METHOD AND APPARATUS FOR MOLDED RESIN MATERIALS

BACKGROUND OF THE INVENTION

1. Field of the Invention

This invention relates to an ultrasonic welding method for molded resin materials, wherein an upper shell half and a lower shell half of a magnetic disk cartridge, or the like, are joined to each other with an ultrasonic welding process during the processes for manufacturing the magnetic disk cartridge, or the like. This invention also relates to an apparatus for carrying out the ultrasonic welding method for molded resin materials.

2. Description of the Prior Art

Magnetic disk cartridges, each of which comprises an upper shell half, a lower shell half, and a magnetic disk housed in a shell constituted of the upper shell half and the lower shell half, are widely used as signal recording media for recording various signals. During the processes for manufacturing the magnetic disk cartridge, the magnetic disk is placed on the lower shell half, and the upper shell half is superposed upon the lower shell half. In this state, the upper shell half and the lower shell half are joined to each other with an ultrasonic welding process.

An apparatus for carrying out the ultrasonic welding process has been disclosed in, for example, Japanese Unexamined Utility Model Publication No. 1(1989)-127825. The disclosed apparatus comprises a fixed receiving section, on which an upper shell half and a lower shell half having been combined with each other are placed, and a welding horn. The welding horn moves down to the position, at which the upper shell half and the lower shell half having been combined with each other are placed on the receiving section. The welding horn holds the upper shell half and the lower shell half on the receiving section, and generates ultrasonic waves.

With the ultrasonic welding process, welding effects are determined by the amplitude of vibration at the leading end of the welding horn, the pressure applied by the welding horn onto the upper shell half and the lower shell half, and the time, for which the ultrasonic waves are applied to the upper shell half and the lower shell half. Of these three factors, the amplitude of vibration and the time, for which the ultrasonic waves are applied to the upper shell half and the lower shell half, can be set accurately.

However, the thicknesses of upper shell halves and lower shell halves vary depending on a small difference in the shape between cavities of a mold of a molding machine, or on a small difference in the shape between the molds. Therefore, a small difference occurs in the thickness between a plurality of upper shell halves and a plurality of lower shell halves, which have been molded with the molding machine. In such cases, with the conventional apparatus for carrying out the ultrasonic welding process, the pressure applied by the welding horn onto the upper shell half and the lower shell half varies for different combinations of upper shell halves and lower shell halves or for different parts of a single combination of an upper shell half and a lower shell half.

As a result, the welding effects on the upper shell half and the lower shell half vary for different combinations of upper shell halves and lower shell halves or for different welded parts of a single combination of an upper shell half and a lower shell half. Accordingly, the upper shell half and the lower shell half cannot be accurately joined to each other.

SUMMARY OF THE INVENTION

The primary object of the present invention is to provide an ultrasonic welding method for molded resin materials wherein, even if the thicknesses of molded resin materials vary, the molded resin materials can be accurately welded to each other.

Another object of the present invention is to provide an apparatus for carrying out the ultrasonic welding method for molded resin materials.

In an ultrasonic welding method for molded resin materials in accordance with the present invention and an apparatus for carrying out the method, a plurality of parts of a molded material receiving section, on which molded resin materials are placed, are supported by a plurality of receiving section support members. The supporting forces of the plurality of the receiving section support members are adjusted independently of each other such that the pressure applied by a welding horn onto each pair of corresponding parts of the molded resin materials, which parts are to be welded to each other, may become equal to a predetermined value.

Specifically, the present invention provides an ultrasonic welding method for molded resin materials, in which molded resin materials, whose corresponding parts to be welded to each other have been superposed one upon the other, are held between a welding horn and a molded material receiving section, and the corresponding parts of the molded resin materials are welded to each other with an ultrasonic welding process, the ultrasonic welding method for molded resin materials comprising the steps of:

i) supporting a plurality of parts of said molded material receiving section independently of each other by a plurality of receiving section support members, and ii) when said corresponding parts of said molded resin materials are welded to each other, adjusting the supporting forces of the plurality of said receiving section support members independently of each other such that a welding pressure applied by said welding horn onto each pair of said corresponding parts of said molded resin materials may become equal to a predetermined value.

The present invention also provides an ultrasonic welding apparatus for molded resin materials, in which molded resin materials, whose corresponding parts to be welded to each other have been superposed one upon the other, are placed on a molded material receiving section, a welding horn located above the molded material receiving section is pushed against the molded resin materials, and the corresponding parts of the molded resin materials are thereby welded to each other with an ultrasonic welding process, wherein the improvement comprises the provision of:

i) a plurality of receiving section support members, which support a plurality of parts of said molded material receiving section independently of each other, and ii) a plurality of supporting force adjusting means, which respectively work on the plurality of said receiving section support members, and which adjust the supporting forces of the plurality of said receiving section support members such that a welding pressure applied by said welding horn onto each pair of said corresponding parts of said molded resin materials may become equal to a predetermined value.

With the ultrasonic welding method and apparatus for molded resin materials in accordance with the present invention, the molded material receiving section is not fixed, but the plurality of parts of the molded material receiving section are supported by the plurality of receiving section support members, which can move up and down. The supporting forces of the plurality of the receiving section support members are adjusted independently of each other such that the welding pressure applied by the welding horn onto each pair of the corresponding parts of the molded resin materials may become equal to a predetermined value.

Therefore, even if the thicknesses of the molded resin materials vary for different molded resin materials, constant welding effects can be obtained at multiple pairs of parts to be welded to each other. Accordingly, the molded resin materials can be accurately joined to each other.

DESCRIPTION OF THE PREFERRED EMBODIMENTS

The present invention will hereinbelow be described in further detail with reference to the accompanying drawings.

Figure 1:
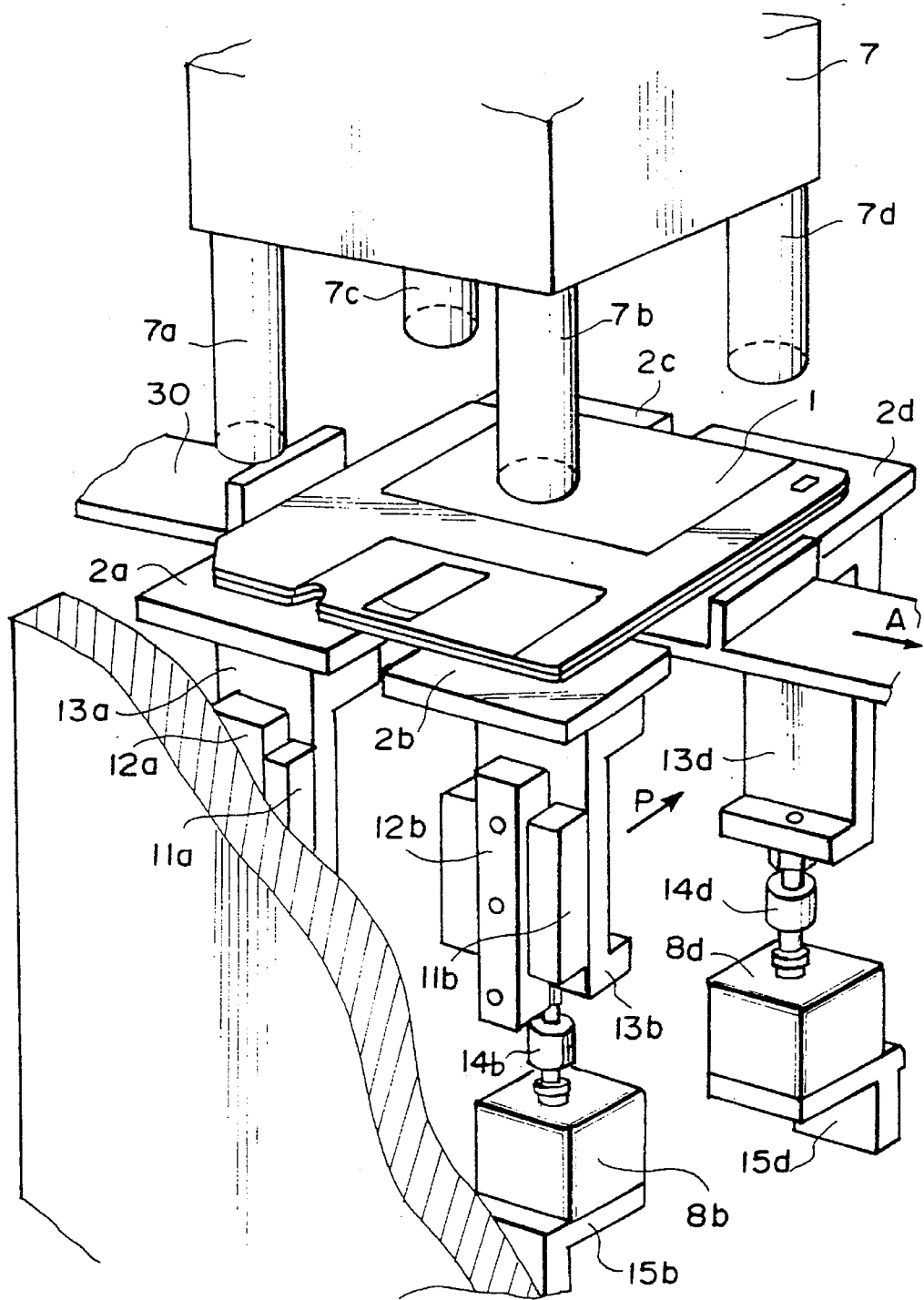
FIG. 1 is a perspective view showing an embodiment of the ultrasonic welding apparatus for molded resin materials in accordance with the present invention.
Figure 2:
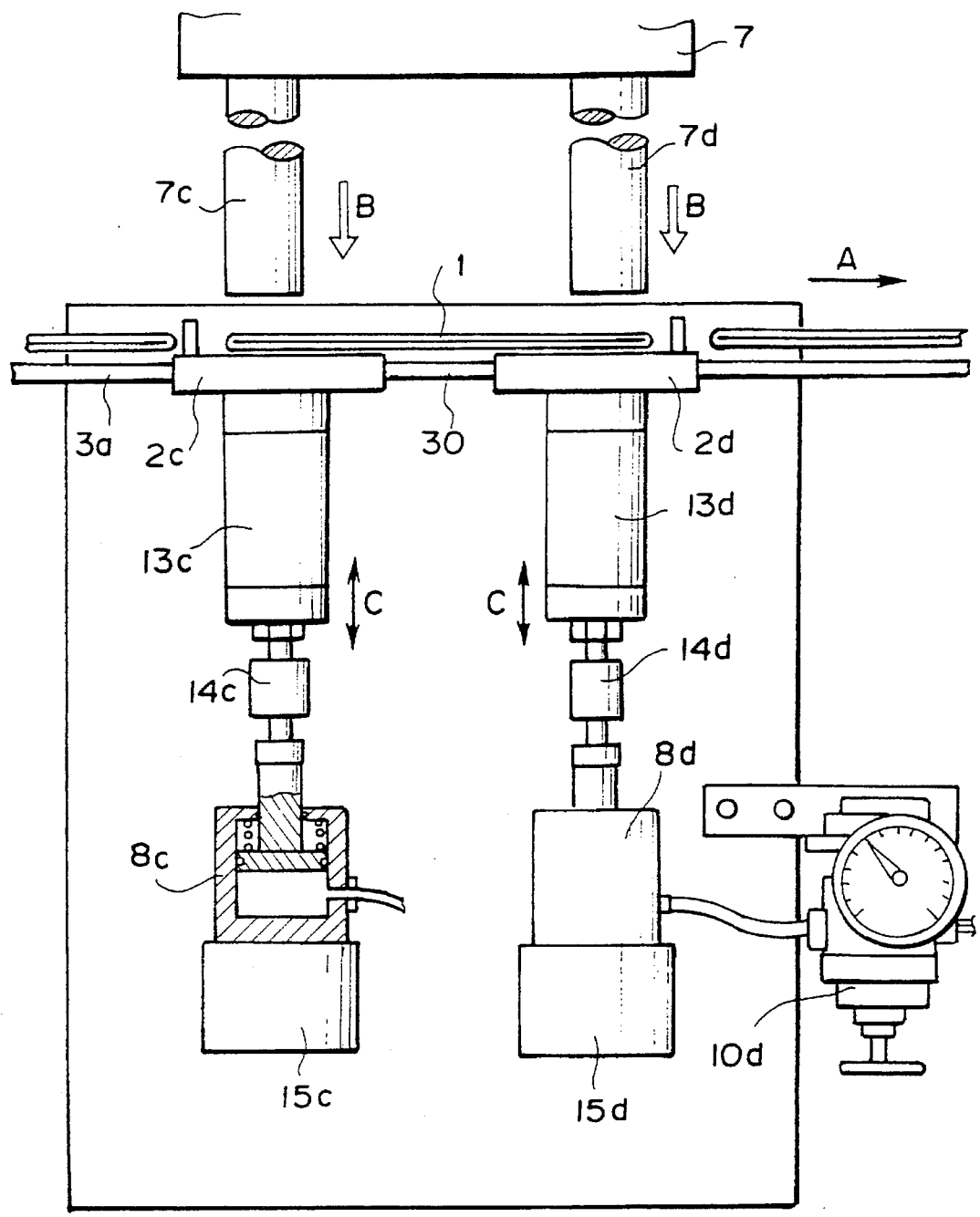
FIG. 2 is a partially sectional side view taken in the direction indicated by the arrow P in FIG. 1.
Figure 3:
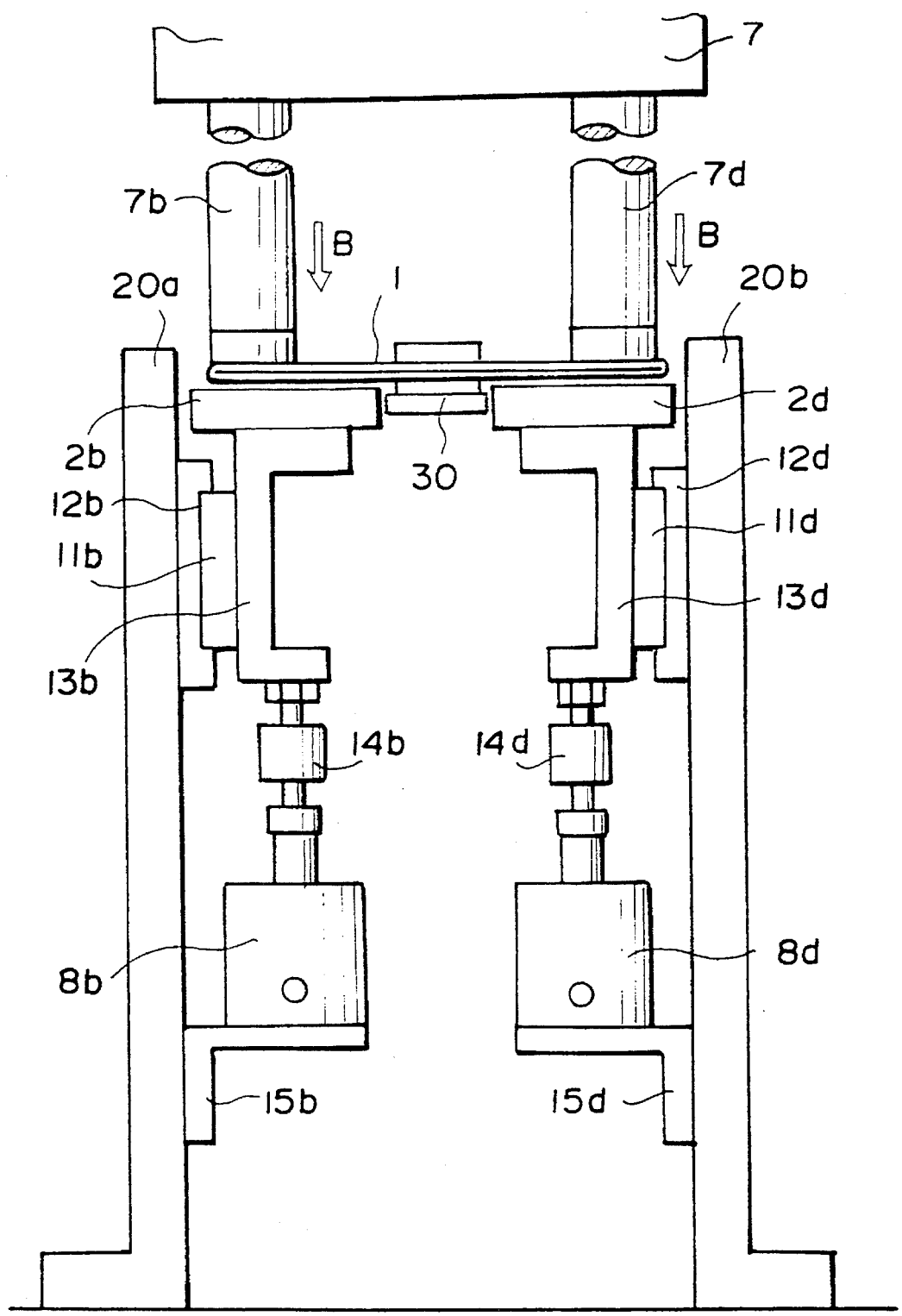
FIG. 3 is a front view showing the embodiment of FIG. 1.

FIG. 1 is a perspective view showing an embodiment of the ultrasonic welding apparatus for molded resin materials in accordance with the present invention, wherein an upper shell half and a lower shell half of a magnetic disk cartridge are welded to each other. FIG. 2 is a partially sectional side view taken in the direction indicated by the arrow P in FIG. 1. FIG. 3 is a front view showing the embodiment of FIG. 1.

Figure 4:
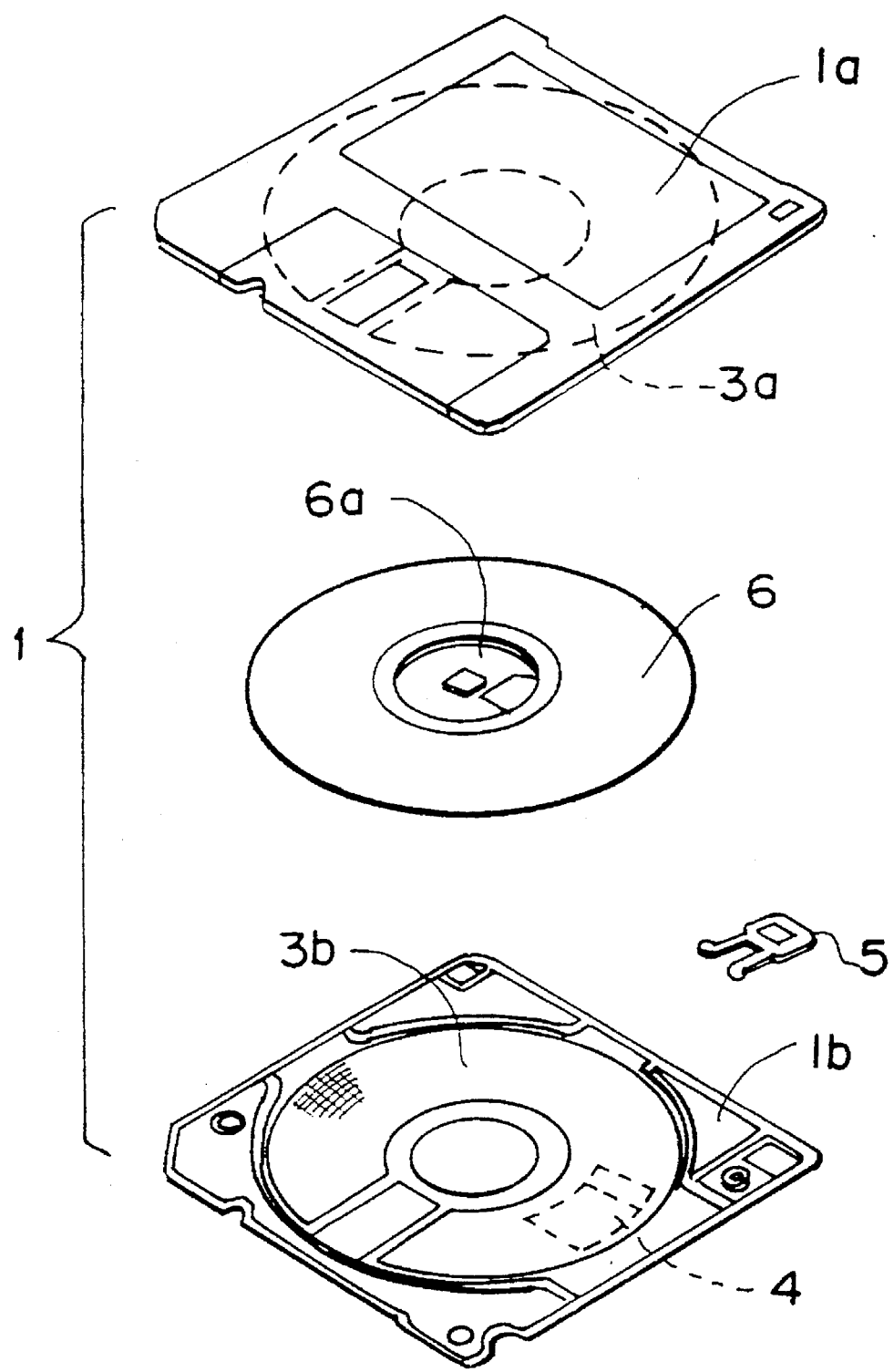
FIG. 4 is an exploded perspective view showing a magnetic disk cartridge comprising an upper shell half and a lower shell half, which are to be welded to each other in the embodiment of FIG. 1.

This embodiment is employed during the processes for manufacturing a magnetic disk cartridge 1. An upper shell half 1a and a lower shell half 1b, in which predetermined mechanism parts have been incorporated, are joined to each other with an ultrasonic welding process. Specifically, as illustrated in FIG. 4, the magnetic disk cartridge 1 comprises the upper shell half 1a, the lower shell half 1b, and the mechanism parts which are incorporated in the upper shell half 1a and the lower shell half 1b. The mechanism parts include nonwoven fabric liners 3a and 3b, a lifter 4, a write protector 5, and a magnetic disk 6 which is adhered to a center core 6a. The upper shell half 1a and the lower shell half 1b, which have been superposed one upon the other and in which the mechanism parts have been incorporated, are conveyed to the position for the ultrasonic welding process in this embodiment by a pitch feed belt 30. The pitch feed belt 30 moves in the direction indicated by the arrow A in FIGS. 1 and 2.

At the position for the ultrasonic welding process, the magnetic disk cartridge 1 is supported by four receiving tables 2a, 2b, 2c, and 2d, which constitute a molded material receiving section. A welding horn 7, which can move up and down, is located above the receiving tables 2a, 2b, 2c, and 2d and joins the upper shell half 1a and the lower shell half 1b to each other with the ultrasonic welding process.

The receiving table 2a is supported on a bracket 13a, which is associated with a linear slide mechanism composed of members 11a and 12a. Also, the receiving tables 2b, 2c, and 2d are respectively supported on brackets 13b, 13c, and 13d, which are respectively associated with a linear slide mechanism composed of members 11b and 12b, a linear slide mechanism composed of members 11c and 12c, and a linear slide mechanism composed of members 11d and 12d. (The linear slide mechanism composed of members 11c and 12c are not shown.) The bottoms of the brackets 13a, 13b, 13c, and 13d are respectively connected to floating joints 14a, 14b, 14c, and 14d, which are in turn connected respectively to air cylinders 8a, 8b, 8c, and 8d. (The floating joint 14a and the air cylinder 8a are not shown.) The air cylinders 8a, 8b, 8c, and 8d serve as receiving section support members. The air cylinders 8a, 8b, 8c, and 8d are provided with air regulators 10a, 10b, 10c, and 10d. (Only the air regulator 10d for the air cylinder 8d is shown in FIG. 2.) The air regulators 10a, 10b, 10c, and 10d adjust the pressures of compressed air fed into the air cylinders 8a, 8b, 8c, and 8d and thereby set the supporting forces of the receiving tables 2a, 2b, 2c, and 2d.

Four child horns 7a, 7b, 7c, and 7d project from the bottom of the welding horn 7. The child horns 7a, 7b, 7c, and 7d come into contact with the upper surface of the upper shell half 1a and produce ultrasonic waves. The air cylinders 8a, 8b, 8c, and 8d are secured to mounts 15a, 15b, 15c, and 15d. (The mount 15a is not shown.)

How the aforesaid embodiment operates will be described hereinbelow.

The upper shell half 1a and the lower shell half 1b, which have been superposed one upon the other and intermittently conveyed by the pitch feed belt 30 to the position for the ultrasonic welding process, are pushed downwardly by the child horns 7a, 7b, 7c, and 7d, which project from the bottom of the welding horn 7. At this time, the force for moving the welding horn 7 downwardly is sufficiently larger than the supporting forces of the receiving tables 2a, 2b, 2c, and 2d, which supporting forces are given by the air cylinders 8a, 8b, 8c, and 8d. The child horns 7a, 7b, 7c, and 7d move down to the lower ends of their movement ranges. In this manner, the upper shell half 1a, the lower shell half 1b, and the receiving tables 2a, 2b, 2c, and 2d are moved down the distances falling within the range of approximately 0.5 mm to approximately 3.0 mm. The receiving tables 2a, 2b, 2c, and 2d are supported by the linear slide mechanism composed of members 11a and 12a, the linear slide mechanism composed of members 11b and 12b, the linear slide mechanism composed of members 11c and 12c, and the linear slide mechanism composed of members 11d and 12d, which can accurately move up and down and have only a negligible level of frictional force. Appropriate levels of pressures are applied by the air cylinders 8a, 8b, 8c, and 8d to the four corners of the combination of the upper shell half 1a and the lower shell half 1b. In this state, the ultrasonic waves are produced by the welding horn 7, and the ultrasonic welding process is carried out.

In general, welding effects are determined by the amplitude of vibration at the leading end of the welding horn, the pressure applied by the welding horn onto the upper shell half and the lower shell half, and the time, for which the ultrasonic waves are applied to the upper shell half and the lower shell half. The amplitude of vibration and the time, for which the ultrasonic waves are applied to the upper shell half and the lower shell half, do not change after they are once set in the ultrasonic welding apparatus. However, the thicknesses of the upper shell half 1a and the lower shell half 1b vary depending on a small difference in the shape between cavities of a mold of a molding machine, on a small difference in the shape between the molds, or the like. In such cases, with the conventional ultrasonic welding apparatus which is provided with a fixed type of molded material receiving section, the pressure applied by the welding horn onto the upper shell half 1a and the lower shell half 1b varies for different combinations of upper shell halves and lower shell halves or for different parts of a single combination of the upper shell half 1a and the lower shell half 1b. As a result, the welding effects on the upper shell half 1a and the lower shell half 1b vary for different combinations of upper shell halves and lower shell halves or for different welded parts of a single combination of the upper shell half 1a and the lower shell half 1b.

In order for such problems of the conventional ultrasonic welding apparatus to be eliminated, with the aforesaid embodiment of the ultrasonic welding apparatus for molded resin materials in accordance with the present invention, the air pressures applied to the air cylinders 8a, 8b, 8c, and 8d are adjusted by the air regulators 10a, 10b, 10c, and 10d. In this manner, the supporting forces of the receiving tables 2a, 2b, 2c, and 2d are adjusted such that, even when the thicknesses of the upper shell half 1a and the lower shell half 1b vary, the pressure applied by each of the child horns 7a, 7b, 7c, and 7d onto each of the parts, which are to be welded to each other, may become equal to a predetermined value.

In cases where the levels of necessary welding energy (i.e. the necessary energy determined by the amount of the energy directors) at the parts of the combination of the upper shell half 1a and the lower shell half 1b, which parts are to be welded to each other, are equal to each other, the same level of welding effects can be obtained at the parts, which are to be welded to each other, by setting the pressures applied by the welding horn 7 to the parts, which are to be welded to each other, to the same value. Therefore, in such cases, the air pressures applied to the air cylinders 8a, 8b, 8c, and 8d are adjusted as being equal to each other by the air regulators 10a, 10b, 10c, and 10d. In this manner, the levels of the pushing force of the air cylinders 8a, 8b, 8c, and 8d are set as being equal to each other.

In cases where the welding allowance varies for different parts, which are to be welded to each other, the air pressures may be set in accordance with the welding allowances by the air regulators 10a, 10b, 10c, and 10d. In this manner, best possible welding effects can be obtained, and conditions, under which the ultrasonic welding process is carried out, can be determined very easily.

In the aforesaid embodiment, the upper shell half 1a and the lower shell half 1b constituting the magnetic disk cartridge 1 are joined to each other with the ultrasonic welding process. However, the ultrasonic welding method and apparatus for molded resin materials in accordance with the present invention are also applicable when other molded resin materials, which are constituted of resins capable of being joined to each other with the ultrasonic welding process, such as polystyrol, AS, ABS, an acrylic resin, polycarbonate, and polyacetal, are joined together with the ultrasonic welding process.

Also, the number of the receiving section support members is not limited to four and may be selected from appropriate values not smaller than two in accordance with the number of the energy directors and their characteristics. Additionally, the molded material receiving section is supported by the plurality of the receiving section support members. Therefore, the molded material receiving section need not necessarily be divided into four parts. In such cases, the same effects as those in the aforesaid embodiment can be obtained.

In the aforesaid embodiment, compressed air is employed as the means for giving the supporting force of the receiving section support members. Alternatively, any of other fluids, such as a hydraulic oil, may be employed for this purpose.

What is claimed is:

1. An ultrasonic welding method for molded resin materials, comprising:

superimposing one upon the other corresponding parts of molded resin materials to be welded together;

holding the superimposed molded resin materials between a welding horn and a molded material receiving section;

supporting a plurality of section parts of said molded material receiving section independently of each other by a plurality of molded material receiving section support members;

associating with each of said section parts only a single different one of a plurality of fluid-pressure cylinders;

welding the corresponding parts of the molded resin materials together by said welding horn; and as said corresponding parts of said molded resin materials are welded together, adjusting supporting forces of the plurality of said molded material receiving section support members independently of each other, by individually regulating the fluid pressure applied by said welding horn onto each pair of said corresponding parts of said molded resin materials is equal to a predetermined value.

2. A method as defined in claim 1 wherein said fluid-pressure cylinders are air cylinders connected to air regulators.

3. A method as defined in claim 1, further comprising providing said welding horn with a plurality of child horns, the number of the plurality of child horns being equal to the number of the plurality of said receiving section support members.

4. A method as defined in claim 1, wherein said molded resin materials comprise an upper shell half and a lower shell half, said upper shell half and said lower shell half together forming a magnetic disk cartridge.

5. An ultrasonic welding apparatus for molded resin materials, comprising:

a molded material receiving section for receiving molded resin materials, corresponding parts of said molded resin materials to be welded together being superposed one upon the other and placed on the molded material receiving section;

a welding horn located above the molded material receiving section, said welding horn being pushed against the molded resin materials and welding the corresponding parts of the molded resin materials together;

a plurality of molded material receiving section support members for supporting only a like said plurality of section parts of said molded material receiving section independently of each other;

said support members comprising a plurality of fluid-pressure cylinders, each associated with a different one of said support members, for independently adjusting supporting forces of respective ones of said plurality of support members, each support member being associated with only a single one of said fluid-pressure cylinders; and means for individually regulating fluid pressure applied to each of said cylinders to adjust the supporting force of each supporting member so that a welding pressure applied by said welding horn onto each pair of said corresponding parts of said molded resin materials is equal to a predetermined value.

6. An apparatus as defined in claim 5 wherein the fluid-pressure cylinders are air-pressure cylinders and the fluid is air.

7. An apparatus as defined in claim 5, wherein said welding horn includes a plurality of child horns, the number of the plurality of child horns being equal to the number of the plurality of said molded material receiving section support members.

8. An apparatus as defined in claim 5, wherein said molded resin materials comprise an upper shell half and a lower shell half, said upper shell half and said lower shell half together forming a magnetic disk cartridge.

9. An ultrasonic welding apparatus according to claim 5, further comprising means for supporting said plurality of molded material receiving section support members, said supporting means comprising a bracket and a floating joint.

10. An ultrasonic welding apparatus according to claim 5, wherein said supporting forge adjusting means is located on only one side of the molded resin materials to be welded together.

* * * * *